United States Patent
DiGiovanni et al.

(10) Patent No.: US 6,363,194 B1
(45) Date of Patent: Mar. 26, 2002

(54) OPTICAL FIBER COMMUNICATION SYSTEM EMPLOYING ND DOPED FIBER AMPLIFIER FOR THE 1400 NM WINDOW

(75) Inventors: David John DiGiovanni, Montclair; Karsten Rottwitt, Basking Ridge, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,201

(22) Filed: Apr. 8, 1999

(51) Int. Cl.[7] .......................... G02B 6/02; H04B 10/00; H01S 3/00
(52) U.S. Cl. .................. 385/123; 385/126; 385/127; 359/154; 359/173; 359/341.1
(58) Field of Search ................... 359/341, 173, 359/154, 341.1; 385/123, 126, 127, 141, 142, 144; 372/6

(56) References Cited

U.S. PATENT DOCUMENTS 3,611,188 A * 10/1971 Snitzer et al. ................ 372/40
5,530,710 A * 6/1996 Grubb ............................ 372/6

* cited by examiner

*Primary Examiner*—Frank G. Font
*Assistant Examiner*—Amanda Merlino
(74) *Attorney, Agent, or Firm*—Lowenstein Sandler PC

(57) ABSTRACT

In accordance with the invention, an optical fiber communication system comprises one or more Nd doped fiber amplifiers for amplified transmission in the 1400 nm window. The amplifier is designed with a combination of waveguide effects and selective absorption to reduce amplified spontaneous emission to acceptable levels.

7 Claims, 3 Drawing Sheets

US 6,363,194 B1

OPTICAL FIBER COMMUNICATION SYSTEM EMPLOYING ND DOPED FIBER AMPLIFIER FOR THE 1400 NM WINDOW

FIELD OF THE INVENTION

This invention relates to optical fiber communication systems and, in particular, to systems using Nd doped fiber amplifiers for amplified transmission in the 1400 nm window.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signals, and amplifiers for amplifying the signals along the transmission path. It also includes a receiver for detecting the signals and for demodulating the information they carry. Increasingly the optical signals are wavelength division multiplexed signals (WDM signals) comprising a plurality of distinct wavelength signal channels.

Optical fiber amplifiers are important components in fiber communication systems. A fiber amplifier typically comprises a length of rare earth doped fiber and a pumping source at an appropriate shorter wavelength than the transmitted signals. When the fiber amplifier is disposed in line with the transmission fiber, it amplifies transmitted signal channels passing through it. For example, Erbium doped fiber amplifiers pumped by light in the wavelength range 975–985 nm and 1470–1490 nm optically amplify signal channels in the 1530–1610 nm window of silica fiber.

New optical transmission fibers, such as All-Wave® fiber marketed by Lucent Technologies, Murray Hill, N.J. have opened up a new possible transmission window at 1400 nm±50 nm. But the conventional Erbium-doped fiber amplifiers are not efficient in this wavelength range.

Raman fiber amplifiers, which work on a different principle from rare earth doped fiber amplifiers, offer one possibility for amplification in this wavelength range. But Raman amplifiers are complex and require much power.

Neodymium (Nd) doped fiber amplifiers in fluoride-based fibers were previously tried for amplification of signals within the 1300 nm window. Efficiency, however, was not good. And Nd doped fibers had a problem with amplified spontaneous emission (ASE). When praseodymium doped fibers were introduced, the work on neodymium doped fibers was abandoned.

Accordingly, there is a need for an optical fiber communication system providing efficient fiber amplification of signal channels transmitted in the 1400 nm window.

SUMMARY OF THE INVENTION

In accordance with the invention, an optical fiber communication system comprises one or more Nd doped fiber amplifiers for amplified transmission in the 1400 nm window. The amplifier is designed with a combination of waveguide effects and selective absorption to reduce amplified spontaneous emission to acceptable levels.

BRIEF DESCRIPTION OF THE DRAWINGS

The advantages, nature and various additional features of the invention will appear more fully upon consideration of the illustrative embodiments now to be described in detail. In the drawings.

It is to be understood that these drawings are for purposes of illustrating the concepts of the invention and, except for the graphs, are not to scale.

DETAILED DESCRIPTION

Figure 1:
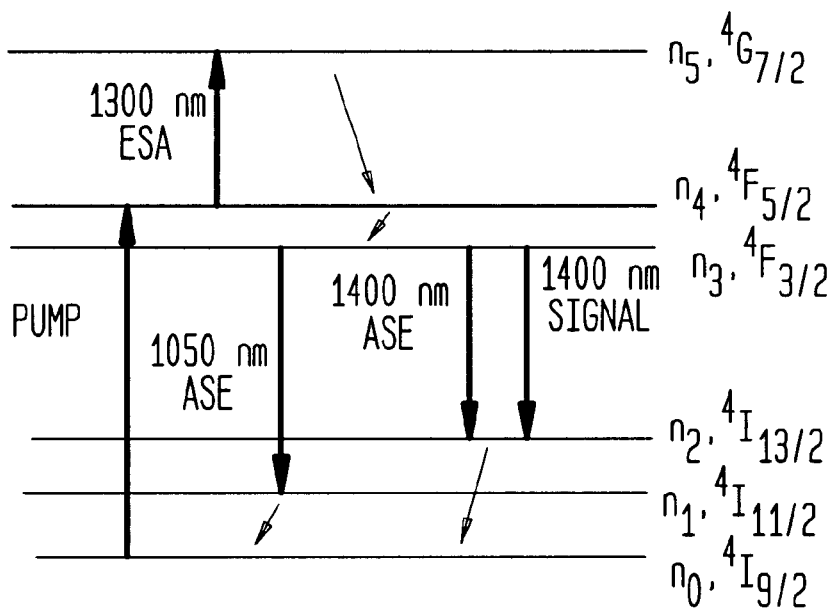
FIG. 1 is a simplified energy diagram for $Nd^{3+}$ doped fiber.

Referring to the drawings, FIG. 1 is a simplified energy level diagram for $Nd^{3+}$ doped fiber useful in understanding the problem to which the invention is directed. The diagram shows six pertinent energy levels designated on the right. It is assumed that the lifetimes of all levels but the $^4F_{3/2}$ level are vanishingly short.

When pump light at 800 nm is launched into the amplifier, $Nd^{3+}$ is excited from the ground state $^4I_{9/2}$ to the state $^4F_{5/2}$. Since the lifetime of the state is extremely short the Nd ions decay immediately to the more stable state $^4F_{3/2}$. The lifetime of this state is assumed to be ~500 μs.

Two processes occur. Electrons can absorb energy from photons at 1300 nm and move up to state $^4G_{7/2}$, and then immediately decay back to the state $^4F_{3/2}$ resulting in the loss of one photon. This process is called excited state absorption (ESA). Alternatively, electrons may decay from the state $^4F_{3/2}$ to states with lower energy for example $^4I_{15/2}$ (not shown in FIG. 1), $^4I_{3/2}$ or $^4I_{11/2}$. In this process a photon will be emitted. All processes may be either spontaneous or stimulated.

The probability for any one of the processes to occur is given through the emission and absorption cross-sections. As indicated in FIG. 1, in fluoride fibers, the absorption cross-section for ESA peaks at ~1300 nm. The emission cross-section for the $^4F_{3/2}-^4I_{11/2}$ transition peaks at ~1050 nm. The emission cross-section for the $^4F_{3/2}-^4I_{13/2}$ transition peaks at ~1330 nm. The emission cross-section for the $^4F_{3/2}-^4I_{15/2}$ transition peaks at ~1800 nm. This latter transition is not shown in FIG. 1 since the cross-section is significantly smaller than all others. Silica fibers behave similarly.

The ESA will not change the inversion (because the $^4G_{7/2}$ state is short-lived), but will reduce the gain. Spontaneous emission from $^4F_{3/2}-^4I_{11/2}$ (1050 nm) will grow as amplified spontaneous emission (ASE) unless it is suppressed.

To optimize an amplifier at 1400 nm, the probability for emission at 1400 nm should be maximized. At the same time the ESA and the ASE around 1400 nm and 1050 nm, respectively, should be minimized. This optimization should be done without incurring any significant penalty on the pump efficiency.

With no parasitic effects such as ESA and ASE, modeling of a fiber with a step-index core profile and 200 ppm mol Nd indicates that a gain of 22 dB may be achieved with 200 mW of pump power at 800 nm in the fundamental $LP_{01}$ mode. This the upper limit to performance.

In fluoride fibers the problem of ESA diminishes as the operating wavelength is increased. We expect the same behavior in a $SiO_2$ based fiber. Thus, ESA at 1400 nm is not expected to be a severe issue. However, there is an indication from the literature (K. Araki et al. J. Appl. Phys) that phosphorus shifts the peak fluorescence to lower wavelengths but aluminum does not. Thus we will use an aluminum doper fiber.

ASE is a significant problem for amplification in the 1400 nm window. Using a conventional step index design as above, inclusion of ASE at 1050 nm reduces the gain from 22 dB to ~6 dB. Clearly this is unacceptable and must be eliminated.

Conventional methods of reducing the ASE are not adequate. The ASE at 1050 nm may be reduced by spatially separating the three wavelengths of interest (pump at 800 nm, ASE at 1050 nm, and signal at 1400 nm).This can be done by locating Nd in a ring around the core and pumping at 800 nm in the $LP_{11}$ mode to amplify the 1400 nm signal in the $LP_{01}$ mode. Since the $LP_{11}$ mode has a doughnut profile, the overlap of 800 nm with Nd is good. Moreover, since the mode field diameter of $LP_{01}$ increases with wavelength, the signal at 1400 nm is sufficiently broad to also have good overlap with the Nd. The ASE at 1050 nm, however, has poor overlap whether it's in $LP_{01}$ or $LP_{11}$ if the ring is properly chosen. Thus, the gain at 1050 nm is diminished. This concept was reported by A. Bjarklev et al. *Electr. Letters,* 1991. Modeling indicates that this method can improve the gain by 5 dB. Which is still not adequate. We seek further improvement.

ASE can be adequately reduced by use of a selective absorber and proper choice of pump mode. Spontaneous emission at 1050 nm cannot be avoided because it is dictated by the emission cross-section of $Nd^3$. However, we have determined that amplification of this emission can be reduced by waveguide control and selective absorption using additional dopants. Careful waveguide design can accentuate the absorption. For example, ytterbium (Yb) absorbs at 1050 nm, but is transparent at 800 nm and 1400 nm.

Figure 2:
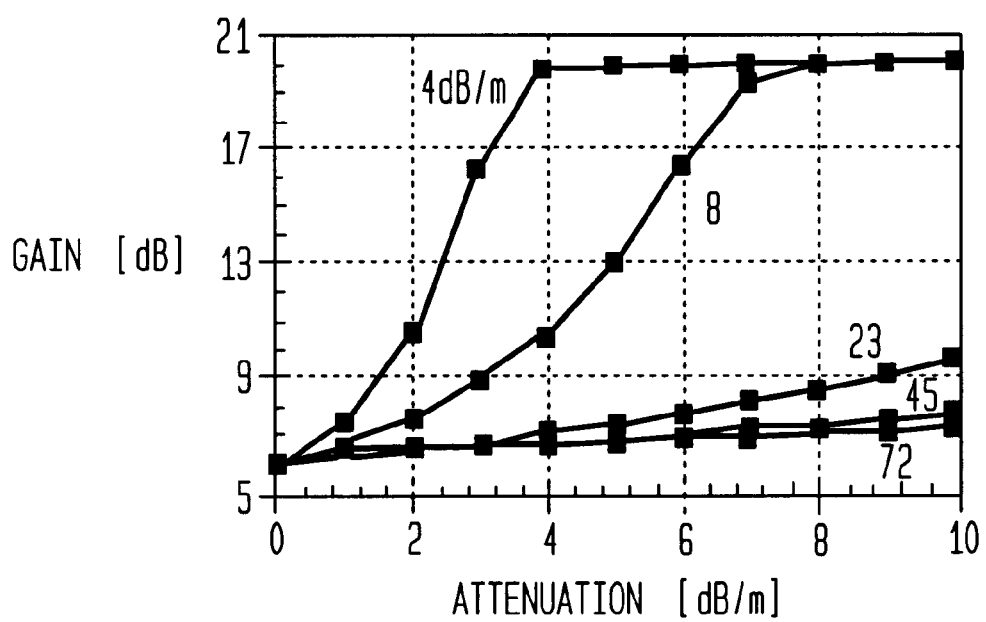
FIG. 2 is a graphical plot of gain versus attenuation at 1050 nm for fiber doped with different levels of Yb.

FIG. 2 graphically illustrates loss in a simulated fiber doped with Yb. The horizontal axis is the attenuation at 1050 nm and the curves are labeled with the absorption of Nd at 800 nm. An absorption of 4 dB/m from Nd at 800 nm corresponds to an amplifier length of 15 m. Reasonable concentrations of Yb can induce about 4 db/m absorption at 1050 nm. Note that the Yb and Nd must be physically separated to avoid nonradiative energy transfer.

Figure 3:
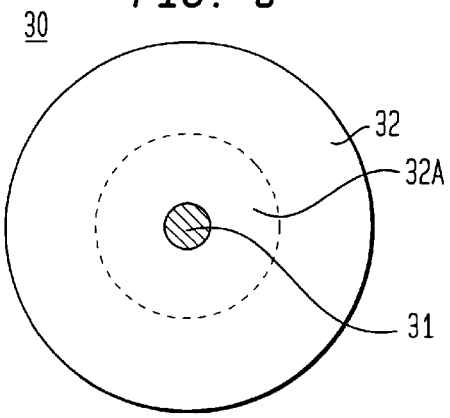
FIGS. 3, 4 and 5 are cross sections of Nd doped fiber including Yb doped regions for reduction of ASE.

FIG. 3 is a transverse cross section of a first embodiment of a Nd doped fiber 30 including a selective absorber doped region to minimize ASE. Here the core 31 is doped with Nd and an inner region 32A of the cladding 32 is doped with Yb. Absorption of the 1050 nm ASE is enhanced by pumping the fiber at 800 nm in the $LP_{01}$ mode. Parasitic ASE at 1050 nm in fiber 30 will be reduced through absorption in the Yb-doped region, but because only a fraction of the 1050 nm light propagates in the cladding, it will be difficult to achieve optimal absorption. This approach does, however, have the advantage of not requiring a mode converter.

Figure 4:
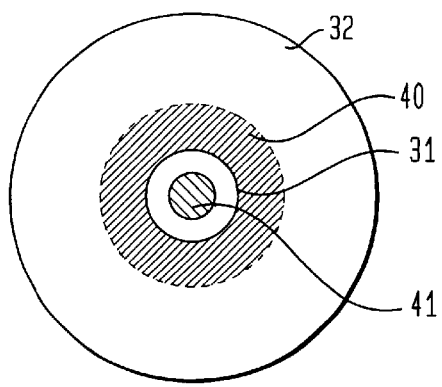

FIG. 4 is a transverse cross section of a second Nd doped fiber 30 configured for $LP_{11}$ pumping. In this design, the fiber comprises a Nd doped ring 40 which can comprise the inner region of cladding 32 and an outer region of core 31. Fiber 30 further includes a Yb-doped central region 41 of core 31. Pump is launched into the $LP_{11}$ to excite the Nd doped ring. The Yb region absorbs at 1050 nm. This approach is based on efficient coupling of pump light in a $LP_{11}$ mode rather than the usual $LP_{01}$ mode. The mode converters for this approach are available using modifications to standard fiber gratings. Achieving 4 dB/m at 1050 nm is feasible.

Figure 5:
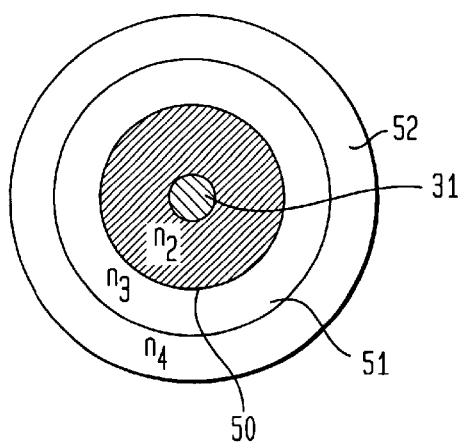

FIG. 5 is a transverse cross section of a third embodiment using multimode pumping. Here the fiber 30 comprises a core 31 and multiple (here 3) layers of cladding 50, 51. 52. Region 52 can be low index polymers. The Nd is doped in the ring-shaped inner cladding 50, and Yb is doped in a central region 31. The pump light is launched into fiber 30 in many modes in the cladding guided by the interface between regions 51, 52. Overlap with the pump is fixed by the ratio of cladding pumped area to doped area. Overlap of Nd with 1050 nm and 1400 nm can be controlled as above through waveguide design. In particular, since the mode field diameter of the fundamental mode increases with wavelength, by placing Nd in a ring, there is relatively greater overlap at 1400 nm than at 1050 nm. This effect can be enhanced by using more complicated index structures such as raised or depressed rings. Overlap with 800 nm pump is enhanced because of the larger cross-sectional area of a ring. This multiple structure is well suited to high power. While the selective absorber for the fiber configurations of FIGS. 3, 4 and 5 is Yb, other selective absorbers at 1050 nm could be used. These include Sm or transition metals such as Fe, Cr, Cu or Co.

Figure 6:
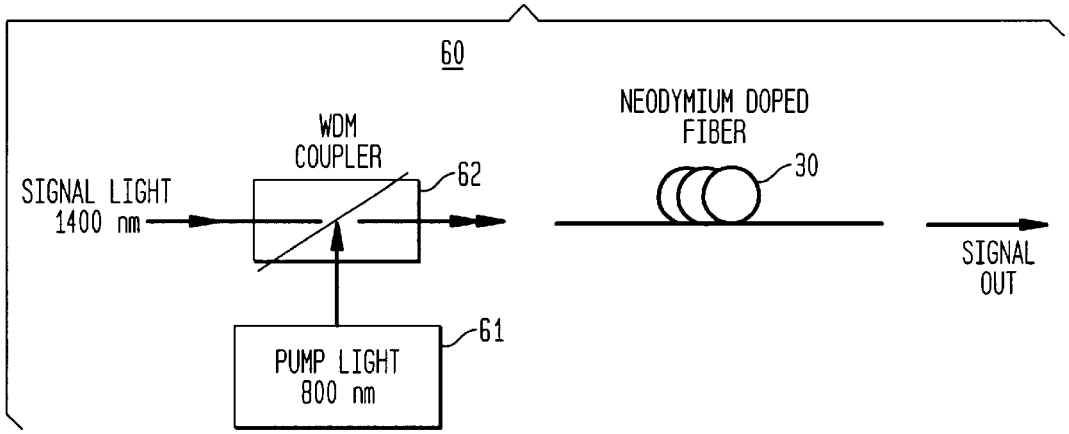
FIG. 6 illustrates a typical amplifier configuration using the Nd doped fibers of FIGS. 3, 4 and 5.

FIG. 6 illustrates a typical Nd fiber amplifier 60 employing Nd and absorber doped fiber 30 in accordance with FIGS. 3, 4 or 5. In essence, the amplifier 60 comprises a length of fiber 30 such as illustrated in FIGS. 3, 4 or 5, an appropriate pump source 61 and a WDM coupler 62 for applying signal light and pump light to the fiber 30. The pump source 61 includes in its waveguiding appropriate mode converters (not shown).

The fiber amplifier of FIG. 6 can be turned into a fiber laser by disposing the fiber 30 within an optical resonant cavity. This can be effected by disposing Bragg gratings reflective in the range 1350–1450 nm at the ends of fiber 30.

Figure 7:
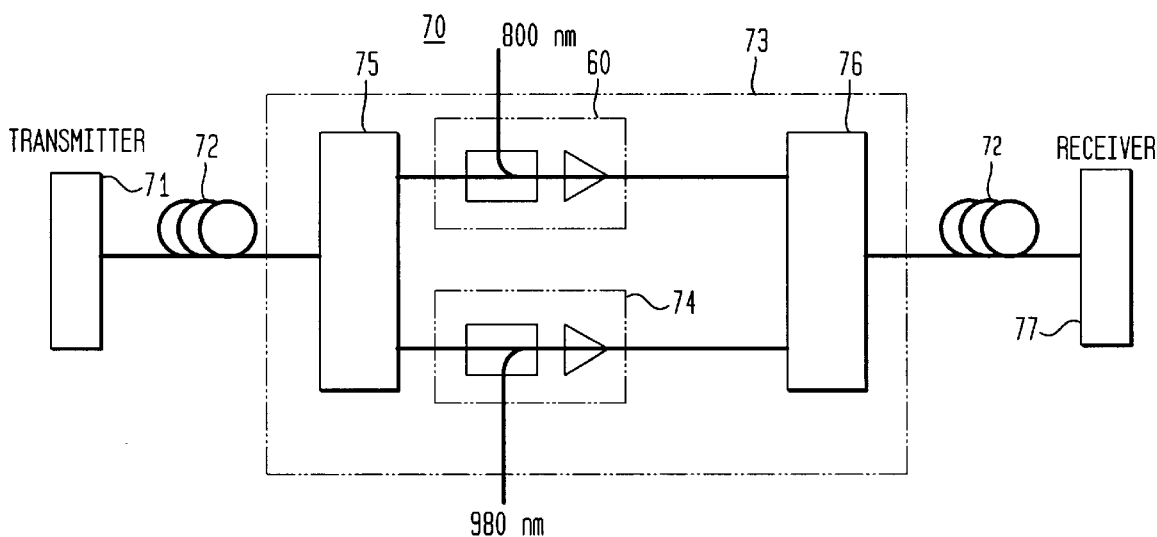
FIGS. 7 and 8 illustrate optical fiber communication systems using Nd doped fiber amplifiers.

FIG. 7 schematically illustrates a first embodiment of an optical fiber communication system 70 employing a Nd doped fiber amplifier 60. In essence, system 70 comprises a WDM optical transmitter 71, a wide band transmission optical fiber 72 and an amplifying arrangement 73 comprising a Nd doped amplifier 60 parallel with an Er doped amplifier 74.

In operation, a WDM demultiplexer 75 splits the transmitted signal channels between those in the 1400 nm window which are directed to the Nd doped amplifier 60 and those in the conventional $SiO_2$ window which are directed to the Er doped amplifier 74. The respectively amplified signal channels are then recombined in WDM multiplexer 76 for further transmission to a WDM optical receiver 77.

Figure 8:
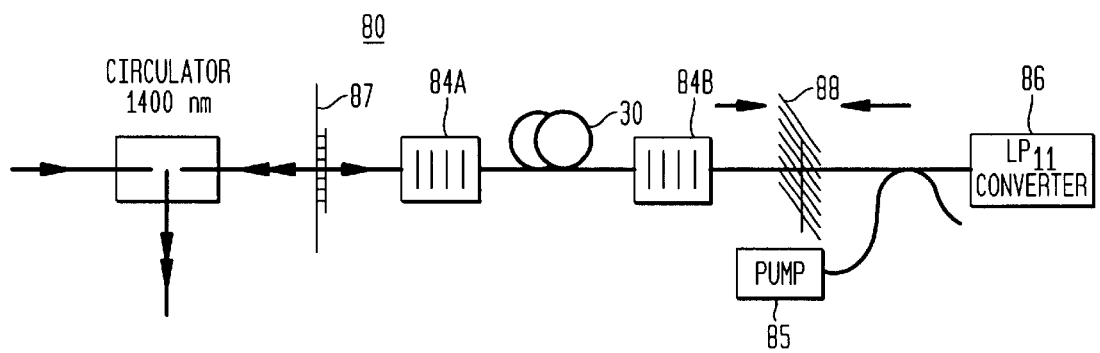

FIG. 8 illustrates a second embodiment of a communication system 80 employing a Nd doped fiber amplifier 60. System 80 is particularly adapted for further suppression of 1050 nm ASE. The amplifying arrangement 83 comprises a circulator 84, and a Nd doped amplifier 60 including ASE suppression filters 84A, 84B on either side of the Nd doped fiber 30. It also includes a pump source 85 including an $LP_{11}$ converter 86 and pump filters 87, 88.

In operation, channels in the 1400 nm window pass through circulator 83 and all filters to fiber 30 where they are amplified. ASE at 1050 is minimized using the fiber design of FIG. 4 and an $LP_{11}$ converter with pump source 85. Pump filters 86, 87 keep pump energy in the amplifier fiber 30.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. An optical waveguide amplifier for amplifying optical signals in the wavelength range 1350–1450 nm comprising:

a length of glass optical waveguide comprising in transverse cross section first and second physically separated regions of doping, the first region of doping comprising a central region of the waveguide with doping comprising Nd to amplify said signals and the second region of doping comprising a region peripherally surrounding the first region with doping comprising an absorbing material which absorbs amplified spontaneous emission at about 1050 nm; and a pumping source optically coupled to said waveguide for providing pump energy at about 800 nm.

2. The amplifier of claim 1 wherein said absorbing material comprises Yb.

3. The amplifier of claim 1 wherein the waveguide comprises an optical fiber.

4. An optical fiber communication system comprising:

an optical transmitter for launching a wavelength division multiplexed optical signal;

a transmission optical fiber for transmitting the optical signal;

an optical receiver for receiving the optical signal; and disposed in the optical path between the transmitter and the receiver, an optical waveguide amplifier according to claim 1.

5. The communication system of claim 4 wherein an Er doped amplifier is disposed in the optical path in parallel with the amplifier according to claim 1.

6. An optical fiber laser comprising an optical fiber amplifier according to claim 1.

7. The waveguide amplifier of claim 1 wherein said waveguide comprises an optical fiber having a multiple layer cladding to permit multimode pumping.

* * * * *